US009072079B2

United States Patent
Luo

(10) Patent No.: US 9,072,079 B2
(45) Date of Patent: Jun. 30, 2015

(54) METHOD FOR CONTROLLING CHANNEL ACCESS, ACCESS POINT AND USER EQUIPMENT

(71) Applicant: China Mobile Communications Corporation

(72) Inventor: Haiyun Luo, Sunnyvale, CA (US)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 173 days.

(21) Appl. No.: 13/689,463

(22) Filed: Nov. 29, 2012

(65) Prior Publication Data

US 2014/0146755 A1    May 29, 2014

(51) Int. Cl.
*H04W 74/00* (2009.01)
*H04W 74/02* (2009.01)
*H04W 72/12* (2009.01)

(52) U.S. Cl.
CPC .............. *H04W 74/02* (2013.01); *H04W 72/12* (2013.01)

(58) Field of Classification Search
CPC ... H04W 28/04; H04W 72/04; H04W 72/042; H04W 88/08; H04L 5/007
USPC ........................................................ 370/329
See application file for complete search history.

(56) References Cited

U.S. PATENT DOCUMENTS

| | | | |
|---|---|---|---|
| 8,059,591 B1 * | 11/2011 | Talley et al. ................... | 370/329 |
| 2006/0045059 A1 * | 3/2006 | Yun et al. ....................... | 370/338 |
| 2009/0122766 A1 * | 5/2009 | Hughes et al. ................. | 370/336 |
| 2009/0274047 A1 * | 11/2009 | Kruys et al. .................... | 370/236 |
| 2010/0205029 A1 * | 8/2010 | Asherman et al. ................ | 705/8 |
| 2010/0254321 A1 * | 10/2010 | Kim et al. ....................... | 370/329 |
| 2010/0322156 A1 * | 12/2010 | Wu ............................... | 370/329 |
| 2011/0085475 A1 * | 4/2011 | Sinivaara et al. ............. | 370/277 |
| 2012/0045005 A1 * | 2/2012 | Kim et al. ...................... | 375/260 |
| 2012/0269120 A1 * | 10/2012 | Zhang et al. ................... | 370/328 |

* cited by examiner

*Primary Examiner* — Charles C Jiang
*Assistant Examiner* — Thad Defauw
(74) *Attorney, Agent, or Firm* — Workman Nydegger

(57) ABSTRACT

The present invention discloses a method for controlling a channel access, an access point and a user equipment. The method comprises: determining a next device for accessing a channel according to a predefined rule; when the next device for accessing the channel is a traditionally active status device, scheduling the traditional active status device to occupy the channel once the channel is free; when the next device for accessing the channel is a newly active status device, determining a next traditionally active device for accessing the channel according to the predefined rule, and scheduling all newly active status devices and the next traditionally active status device to contend for accessing the channel once the channel is free.

17 Claims, 4 Drawing Sheets

| Octets: | 2 | 2 | 6 | 6 | 1 | 4 |
|---|---|---|---|---|---|---|
| Frame Control | Duration | Destination Address | Next Address | Contend Priority | CRC |

| Frame Control | Duration | Address 1 | Address 2 | Address 3 | Sequence Control | Address 4 | Next Address | Contend Priority | Payload | CRC |
|---|---|---|---|---|---|---|---|---|---|---|

METHOD FOR CONTROLLING CHANNEL ACCESS, ACCESS POINT AND USER EQUIPMENT

FIELD

The present invention relates to the field of communications and particularly to a method for controlling a channel access, an access point and a user equipment.

BACKGROUND

Operators have adopted Wireless Local Area Network (WLAN) for branching data flow in a cellular data network in recent years. The cover range of WLAN has been spread out gradually from indoor to outdoor. WLAN has become a part and parcel of a commercial network system. For a commercial network available to the masses, controllable bandwidth allocation and management are basic requirements of the commercial network for operating. For example, in a Digital Subscriber Line (DSL) network, operators may provide different users with different networking rates, e.g., from 100 Kbps to 2 Mbps, according to networking service fees selected by the users. However, current WLAN technologies, products, and standards are mainly for an indoor and enterprise use, and performances of which (including workability, reliability and stability) have not met with the requirements of the commercial network available to the masses.

Particularly, existing channel access schemes in WLAN mainly include the following 1-3.

1. a contention-based channel access scheme as illustrated in FIG. 1: This scheme merely ensures user equipments accessing a network simultaneously to share uplink and downlink bandwidth resources of an air interface in a relatively fair way. Under the contention-based channel access scheme, mean channel efficiency drops rapidly along with an increasing number of user equipments accessing the network simultaneously, as illustrated in FIG. 2. Thus network resources are wasted greatly, a networking rate of a user is influenced with uncertain factors, and complaints from users occur frequently.

2. an enhanced contention-based channel access scheme: Four queues are maintained at the Access Point (AP) side for four different applications of voice, video, best effort, and background in this scheme. Bandwidth resources for the four different applications are controlled by scheduling the four queues. Specifically, different parameters in a link layer are adopted for data packets in the four queues to distinguish the priorities of the four different applications in contending for accessing a channel, where, data packets of voice have the highest priority, and priorities are degraded sequentially for data packets of video, best effort, and background. With the enhanced contention-based channel access scheme, only four predefined applications rather than users can be distinguished, and control with a finer granularity is not available.

3. an AP-controlled channel access scheme: This scheme defined in a preliminary standard of WLAN is similar to a channel resource allocation scheme in a cellular network. In this scheme, an AP has to poll all user equipments periodically to collect information of user equipments to be accessing a channel and scheduling the user equipments in a unified manner. This increases greatly a delay time of an internet session of a new device in requesting network resources. Particularly, when there are only a few user equipments accessing the network simultaneously, the channel efficiency of the AP-controlled channel access scheme is far below that of the contention-based channel access scheme. Moreover, a method for controlling a channel access based on the AP-controlled channel access scheme is too complicated, and the AP-controlled channel access scheme is not compatible with the existing contention-based channel access scheme and is not in use actually.

SUMMARY

Embodiments of the invention provide a method for controlling a channel access so as to implement channel resource allocation for user equipments accessing the network simultaneously with a relatively low complexity.

Correspondingly, embodiments of the invention provide an access point and a user equipment.

A method for controlling a channel access includes:

determining a next device for accessing a channel according to a predefined rule;

when the determined next device for accessing the channel is a traditionally active status device, scheduling the traditional active status device to occupy the channel once the channel is free;

when the determined next device for accessing the channel is a newly active status device, determining a next traditionally active status device for accessing the channel according to the predefined rule, and scheduling all newly active status devices and the next traditionally active status device to contend for accessing the channel once the channel is free;

where, a traditionally active status device is an access point having a downlink data packet to be transmitted or a user equipment having an uplink packet burst to be transmitted in which at least a number N of data packets have been uplink transmitted and at least one data packet has not been uplink transmitted; a newly active status device is a user equipment having an uplink packet burst to be transmitted in which not all of a first number N of data packets have been uplink transmitted; and where, N is a positive integer.

An access point includes:

a determining device configured for determining a next device for accessing a channel according to a predefined rule; and a scheduling device configured, when the next device for accessing the channel determined by the determining device is a traditionally active status device, for scheduling the traditional active status device to occupy the channel once the channel is free; and when the next device for accessing the channel determined by the determining device is a newly active status device, for triggering the determining device to determine a next traditionally active status device for accessing the channel according to the predefined rule and scheduling all newly active status devices and the next traditionally active status device for accessing the channel determined by the determining device to contend for accessing the channel once the channel is free;

where, a traditionally active status device is an access point having a downlink data packet to be transmitted or a user equipment having an uplink packet burst to be transmitted in which at least a number N of data packets have been uplink transmitted and at least one data packet has not been uplink transmitted; a newly active status device is a user equipment having an uplink packet burst to be transmitted in which not all of a first number N of data packets have been uplink transmitted; and where, N is a positive integer.

A user equipment includes:

a determining device configured for determining the user equipment as a traditionally active status device having an uplink packet burst to be transmitted in which at least a number N of data packets have been uplink transmitted and at least one data packet has not been uplink transmitted; or as a newly active status device having an uplink packet burst to be transmitted in which not all of a first number N of data packets have been uplink transmitted; where, N is a positive integer; and a receiving device configured for receiving a DATA frame or an ACK frame broadcasted by an access point on a channel, wherein, the DATA frame or the ACK frame carries a NEXT ADDRESS field for identifying a next traditionally active status device for accessing the channel and a CONTEND PRIORITY field for identifying whether the next traditionally active status device participates in contending for accessing the channel.

In the method for controlling a channel access, a next device for accessing a channel is determined according to a predefined rule, and if the determined next device is a traditionally active status device, then the traditionally active status device is scheduled to occupy the channel once the channel is free; or if the determined next device is a newly active status device, then firstly a next traditionally active status device for accessing the channel is determined according to the predefined rule, and secondly all newly active status devices and the next traditionally active status device are scheduled to contend for accessing the channel once the channel is free. Thus resource allocation for user equipments accessing the network simultaneously can be implemented with a low complexity. With the method for controlling a channel access, all traditionally active status devices are organized together implicitly to form a single virtual device which contends for accessing the channel along with respective newly active status devices, thus reducing the number of user equipments participating in contending for accessing the channel and improving the channel efficiency.

DETAILED DESCRIPTION OF THE EMBODIMENTS

Figure 1:
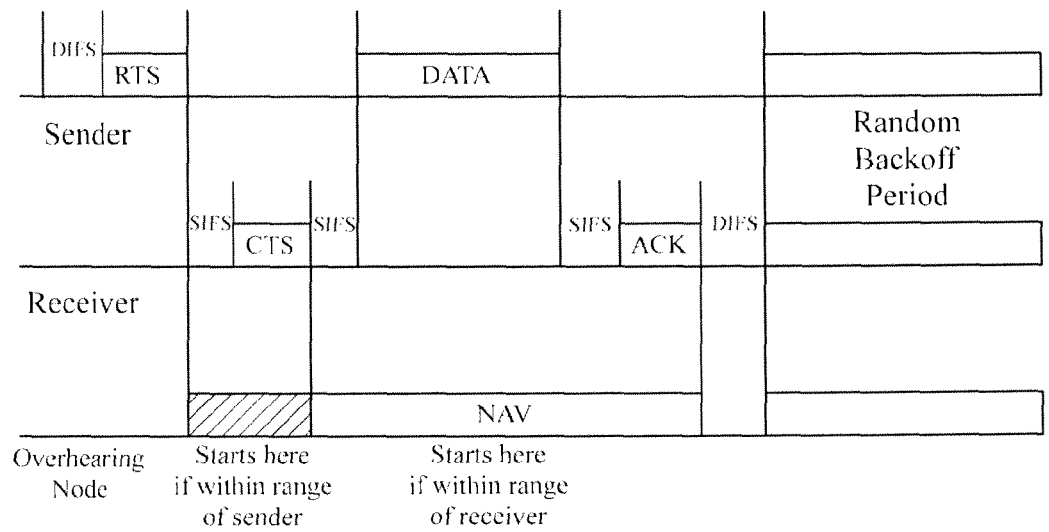
FIG. 1 is a schematic diagram of a contention-based channel access scheme in the prior art.
Figure 2:
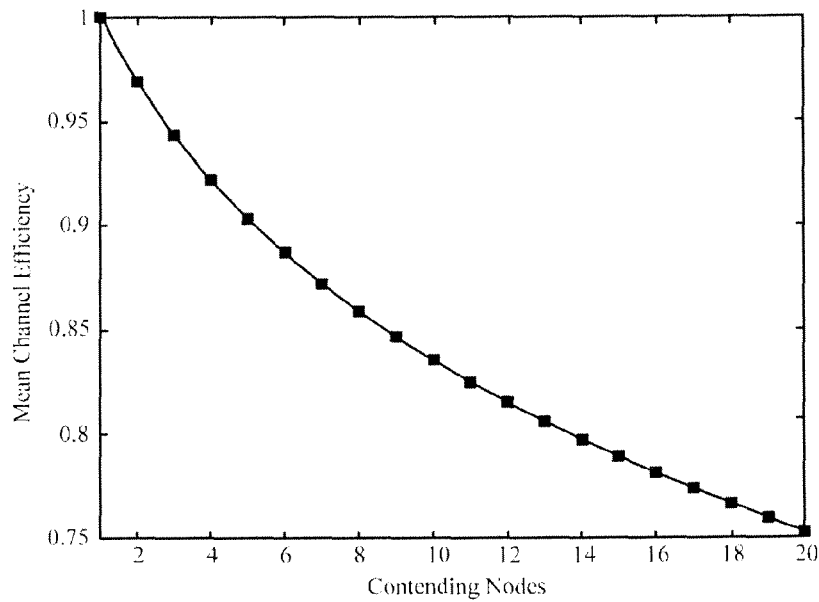
FIG. 2 is a curve of mean channel efficiency versus contending nodes under the contention-based channel access scheme in the prior art.

A scheme for controlling a channel access in an embodiment of the invention includes: determining a next device for accessing a channel according to a predefined rule; when the determined next device for accessing the channel is a traditionally active status device, scheduling the traditional active status device to occupy the channel once the channel is free; when the determined next device for accessing the channel is a newly active status device, determining a next traditionally active status device for accessing the channel according to the predefined rule, and scheduling all newly active status devices and the next traditionally active status device to contend for accessing the channel once the channel is free.

Embodiments of the invention are detailed below by referring to the Drawings.

Figure 3:
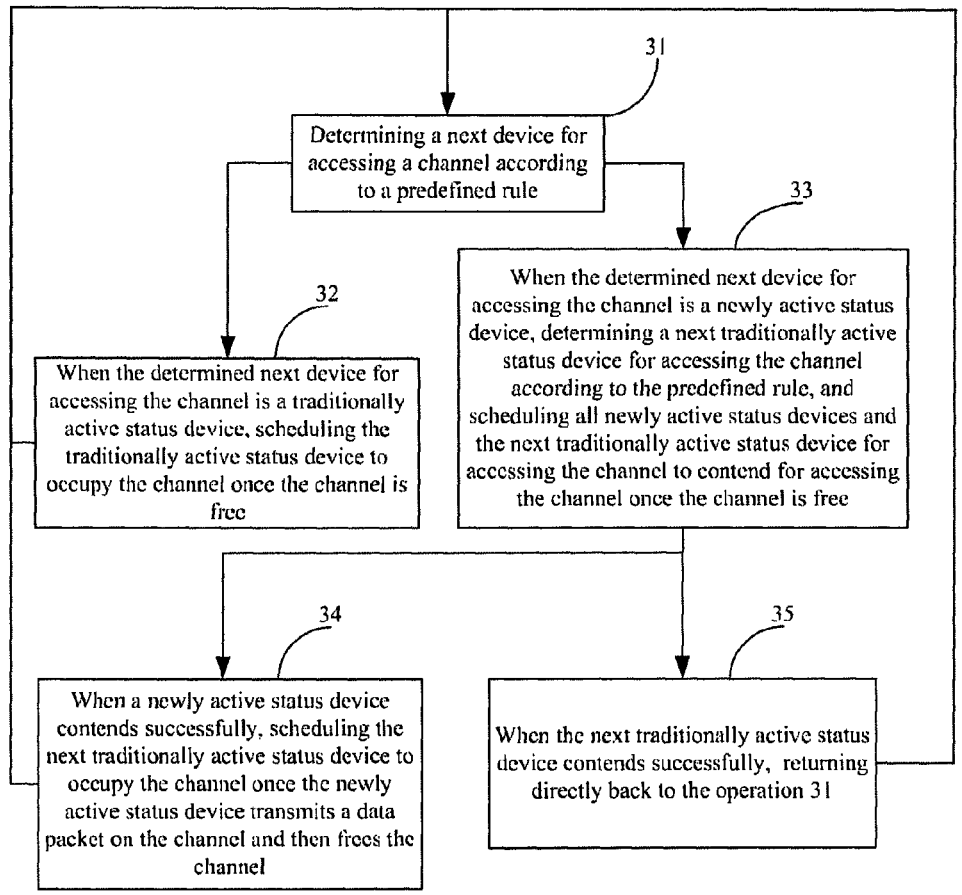
FIG. 3 is a flow chart of a method for controlling a channel access in an embodiment of the invention.

FIG. 3 is a flow chart of a method for controlling a channel access in an embodiment of the invention, which includes the following operations 31 to 35.

Operation 31, a next device for accessing a channel is determined according to a predefined rule;

Operation 32, when the determined next device for accessing the channel is a traditionally active status device, then the traditionally active status device is scheduled to occupy the channel once the channel is free; and thereafter the flow returns back and the operation 31 is executed;

Operation 33, when the determined next device for accessing the channel is a newly active status device, then firstly a next traditionally active status device for accessing the channel is determined according to the predefined rule, and secondly all newly active status devices and the next traditionally active status device are scheduled to contend for accessing the channel once the channel is free;

Operation 34, when a newly active status device contends successfully, then the next traditionally active status device for accessing the channel is scheduled to occupy the channel once the newly active status device transmits a data packet on the channel and then frees the channel; and thereafter the flow returns back and the operation 31 is executed; and Operation 35, when the next traditionally active status device for accessing the channel contends successfully, the flow returns back and the operation 31 is executed.

where, a traditionally active status device is an access point having a downlink data packet to be transmitted or a user equipment having an uplink packet burst to be transmitted in which at least a number N of data packets have been uplink transmitted and at least one data packet has not been uplink transmitted; a newly active status device is a user equipment having an uplink packet burst to be transmitted in which not all of a first number N of data packets have been uplink transmitted; and where, N is a positive integer.

Figure 4:
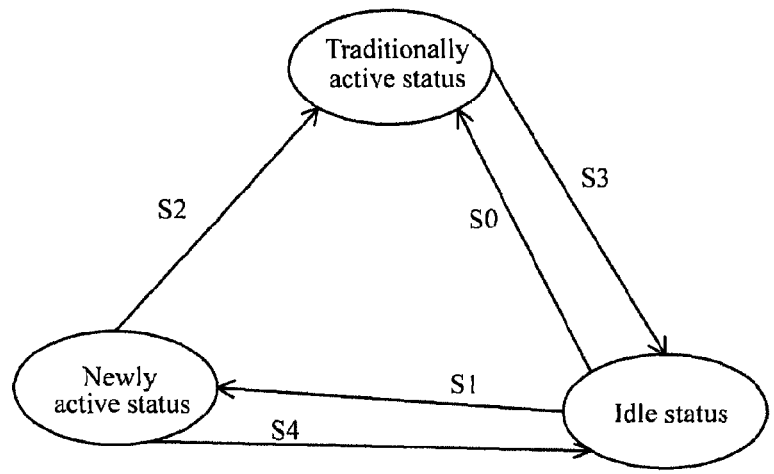
FIG. 4 is a schematic diagram of a device status conversion according to an embodiment of the invention.

A device status conversion according to an embodiment of the invention is detailed below. Referring to FIG. 4, three kinds of statuses are defined for a device in a network, i.e., an idle status, a traditionally active status, and a newly active status, according to an embodiment of the invention. A conversion between the three kinds of statuses is as follows.

S0, when an Access Point (AP) begins to have a downlink data packet to be transmitted, i.e., when a new data packet enters into a downlink queue of the AP from a backpropagation network, the AP converts from an idle status to a traditionally active status;

S1, when a User Equipment (UE) begins to have an uplink data packet or packet burst to be transmitted, i.e., when the UE generates one or more data packets entering into a wireless uplink queue of the UE, the UE converts from an idle status to a newly active status;

S2, a newly active status UE (i.e., a UE in a newly active status) contends for accessing a channel under an existing contention-based channel access scheme until the UE transmits a number N of uplink data packets successfully, where, N is a positive integer, e.g., N equals to one. If the uplink queue of the UE is not null at this time, i.e., at least one uplink data packet to be transmitted is in the uplink queue of the UE at this time, then the UE converts from a newly active status to a traditionally active status; otherwise, if the uplink queue of the UE is null at this time, then the UE turns back to an idle status via S4;

S3, after a traditionally active status UE transmits the last one data packet, i.e., the uplink queue of the UE is empty, the UE converts to an idle status; similarly, when a downlink queue of a traditionally active status AP is empty, the AP converts to an idle status.

Figures 5, 6, 7:
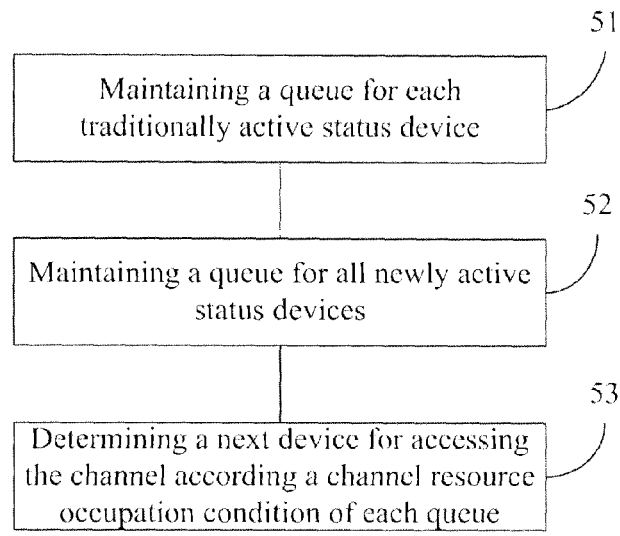
FIG. 5 is a schematic diagram of a process for determining a next device for accessing a channel according to an embodiment of the invention.
FIG. 6 is a schematic diagram of a DATA frame in an embodiment of the invention.
FIG. 7 is a schematic diagram of an ACK frame in an embodiment of the invention.

The operation 31 of determining a next device for accessing a channel according to a predefined rule is specifically illustrated as in FIG. 5, which includes the following operations 51 to 53.

Operation 51, a queue is maintained for each traditionally active status device (i.e., a device in a traditionally active status);

In embodiments of the invention, an AP is taken as an example of a scheduling device at the network side.

For example, a list of traditionally active status UEs is maintained at the AP side. For N=1, the list is established and/or filled in, in response to an event that the AP receives a first uplink data packet transmitted from a UE. Assuming there are a number X of traditionally active status UEs in the network, then an example of the list is as follows:

| Identifier of UE (MAC Address) | Parameters of network service protocol of user |
|---|---|
| N1 | <T1, D1 ...> |
| ... | ... |
| Nx | <Tx, Dx, ...> |

Where, N1-Nx are identifiers of UEs, e.g., MAC addresses of UEs. The AP may download parameters of a network service protocol of a user (e.g., rate T, time delay D, etc.) from a management database and fill in the above list with the downloaded parameters.

The AP maintains a virtue queue for each traditionally active status UE according to the list of all traditionally active status UEs. Using the virtue queue, the traditionally active status UE may be scheduled to access the channel.

It is noted that the same user may own at least two traditionally active status UEs. Thus at least two queues for the at least two traditionally active status UEs belonging to the same user may be combined into one queue.

Further, the AP may maintain a true queue representing a downlink data packet of the AP, that is, if the AP has a downlink data packet to be transmitted (i.e., the AP is a traditionally active status device), then the AP maintains a true queue for itself.

Operation 52, a queue is maintained for all newly active status devices (i.e., all devices in a newly active status);

A virtue queue representing data packets of all newly active status devices is maintained at the AP side.

In view of the above, a number X+1 of virtue queues and one true queue are maintained at the AP side, that is, a total number X+2 of queues are maintained.

It should be noted that the sequence of the above operations 51 and 52 may be reversed.

Operation 53, the next device for accessing the channel is determined according to a channel resource occupation condition of each queue.

For example, determining the next device for accessing the channel according to a channel resource occupation condition of each queue may be implemented in a Weighted Round Robin (WRR) mechanism, and a detailed illustration thereof will be omitted here.

When at least two queues for at least two traditionally active status UEs belonging to the same user are combined into one queue, the next device for accessing the channel may be determined according to a channel resource occupation condition of each queue and a network service protocol of each user.

The scheduling processes in the above operations 32 and 33 specifically include:

broadcasting a DATA frame or an ACK frame transmitted by an AP on the channel to all devices in the network, where, the DATA frame or the ACK frame carries a NEXT ADDRESS field for identifying a next traditionally active status device for accessing the channel and a CONTEND PRIORITY field for identifying whether the device (i.e., the next traditionally active status device) participates in contending for accessing the channel.

According to an embodiment of the invention, a DATA or ACK frame transmitted by an AP is extended and broadcasted. The extended DATA frame is structured as in FIG. 6, and the extended ACK frame is structured as in FIG. 7.

Where, for example, the NEXT ADDRESS field may be constituted with an MAC address of 6 bytes which represents the MAC address of a next scheduled traditionally active status device (i.e., a next traditionally active status device for accessing the channel); and the CONTEND PRIORITY field may include one byte, and the lowest bit of the byte may be used to identify whether the next scheduled traditionally active status device participates in contending for accessing the channel, for example, the lowest bit of the byte has a default value 0 which represents that the device participates in contending for accessing the channel, and the value of the lowest bit of the byte may be set to 1 which represents that the device does not participate in contending for accessing the channel, and the other 7 bits of the byte may be reserved and have a default value 0.

Both of the two newly added fields, i.e., the NEXT ADDRESS field and the CONTEND PRIORITY field, are protected through the Cyclic Redundancy Check (CRC).

According to embodiments of the invention, the DATA and/or ACK frame transmitted by the AP are extended, but the DATA and ACK frame transmitted by a UE may not be extended.

For better understanding, an example is illustrated below.

Assuming current newly active status devices include UE1 and UE2, and current traditionally active status devices includes UE3, UE4, UE5, UE6, and AP, then a number 5 of queues for the traditionally active status devices UE3, UE4, UE5, UE6, and AP and one queue for the newly active status devices are maintained at the AP side.

When a next device for accessing the channel is determined as UE4 (i.e., the queue maintained for UE4 is determined as the next queue for accessing the channel), the NEXT ADDRESS field carried in a DATA or ACK frame broadcasted by the AP on the channel contains the MAC address of UE4, for example, the AP obtains the MAC address of UE4 from the list maintained for the traditionally active status UEs at the AP side and places the same into the NEXT ADDRESS field of the DATA or ACK frame broadcasted by the AP; and the value of the lowest bit of the CONTEND PRIORITY field carried in a DATA or ACK frame broadcasted by the AP on the channel is set to be 1, which represents that UE4 does not have to participate in contending for accessing the channel once the channel is free, and can occupy the channel once the channel is free.

When a next device for accessing the channel is determined as any newly active status device (i.e., the queue maintained for the newly active status devices UE1 and UE2 is determined as the next queue for accessing the channel), firstly, a next traditionally active status device for accessing the channel is determined according to the predefined rule, e.g. UE5 (i.e., the queue maintained for UE5 is determined as the further next queue for accessing the channel); secondly, the NEXT ADDRESS field carried in a DATA or ACK frame broadcasted by the AP on the channel contains the MAC address of UE5, and the lowest bit of the CONTEND PRIORITY field carried in a DATA or ACK frame broadcasted by the AP on the channel is with the default value 0, which represents that UE5 has to participate in contending for accessing the channel once the channel is free, i.e., UE5 and all newly active status devices of UE1 and UE2 contend for accessing the channel once the channel is free.

After receiving the broadcasted DATA or ACK frame, a traditionally active status device may:

1. determining whether itself is the next traditionally active status device for accessing the channel, according to the NEXT ADDRESS field carried in the received DATA frame or ACK frame; for example, comparing whether the MAC address contained in the NEXT ADDRESS field is consistent with the MAC address of itself, if so, then determining itself is the next traditionally active status device for accessing the channel, otherwise, determining itself is not the next traditionally active status device for accessing the channel;

2. when determining itself is not the next traditionally active status device for accessing the channel, not participating, by the traditionally active status device, in contending for accessing the channel once the channel is free;

3. when determining itself is the next traditionally active status device for accessing the channel, determining whether itself participates in contending for accessing the channel according to the CONTEND PRIORITY field carried in the received DATA frame or ACK frame;

4. when determining itself participates in contending for accessing the channel, contending, by the traditionally active status device, for accessing the channel once the channel is free; and 5. when determining itself does not participate in contending for accessing the channel, occupying, by the traditionally active status device, the channel once the channel is free.

After receiving the broadcasted DATA or ACK frame, a newly active status device ignores the NEXT ADDRESS field and the CONTEND PRIORITY field carried in the received DATA frame or ACK frame and contends for accessing the channel once the channel is free.

Illustration below still refers to the above example.

If the NEXT ADDRESS field carried in the DATA or ACK frame broadcasted by the AP on the channel contains the MAC address of UE4, and the value of the lowest bit of the CONTEND PRIORITY field carried in the DATA or ACK frame is 1, then after receiving the broadcasted DATA or ACK frame, all the newly active status devices UE1 and UE2 ignore the carried NEXT ADDRESS and CONTEND PRIORITY fields and contend for accessing the channel once the channel is free; after receiving the broadcasted DATA or ACK frame, UE4 determines itself as the next traditionally active status device for accessing the channel according to the MAC address of UE4 contained in the NEXT ADDRESS field of the DATA or ACK frame, determines itself does not participate in contending for accessing the channel once the channel is free according to the value of 1 of the lowest bit of the CONTEND PRIORITY field of the DATA or ACK frame, does not participate in contending for accessing the channel along with UE1 and UE2 once the channel is free, and occupies the channel once the channel is free (i.e., after a current ACK frame is transmitted, UE4 occupies the channel immediately for transmitting data in the uplink); and after receiving the broadcasted DATA or ACK frame, each of the other traditionally active status devices UE3, UE5, UE6, and AP determines itself is not the next traditionally active status device for accessing the channel, and does not participate in contending for accessing the channel once the channel is free (i.e., keeps silent once the channel is free).

If the NEXT ADDRESS field carried in the DATA or ACK frame broadcasted by the AP on the channel contains the MAC address of UE5, and the value of the lowest bit of the CONTEND PRIORITY field carried in the DATA or ACK frame is 0, then after receiving the broadcasted DATA or ACK frame, all the newly active status devices UE1 and UE2 ignore the carried NEXT ADDRESS and CONTEND PRIORITY fields and contend for accessing the channel once the channel is free; after receiving the broadcasted DATA or ACK frame, UE5 determines itself as the next traditionally active status device for accessing the channel according to the MAC address of UE5 contained in the NEXT ADDRESS field of the DATA or ACK frame, determines itself participates in contending for accessing the channel once the channel is free according to the value of 0 of the lowest bit of the CONTEND PRIORITY field of the DATA or ACK frame, and participates in contending for accessing the channel along with UE1 and UE2 once the channel is free; and after receiving the broadcasted DATA or ACK frame, each of the other traditionally active status devices UE3, UE4, UE6, and AP determines itself is not the next traditionally active status device for accessing the channel, and does not participate in contending for accessing the channel once the channel is free (i.e., keeps silent once the channel is free).

Further, after UE5, UE1, and UE2 contend for accessing the channel, if UE5 contends successfully, then a next device for accessing the channel is determined according to the predefined rule; if UE1 or UE2 contends successfully, then UE5 may occupy the channel once UE1 or UE2 transmits a data packet on the channel and then frees the channel, and thereafter a next device for determining the channel is determined according to the predefined rule. After the next device for determining the channel is determined, the flow repeated, and a detailed illustration thereof will be omitted here.

Further, after a traditionally active status UE transmits a data packet in the uplink on the channel, if the queue for the UE is null, then the UE converts to an idle status, and the AP may delete information of the UE from the list maintained for all traditionally active status devices by the AP. Specifically, whether the uplink queue for the UE is null may be determined according to a MORE DATA field in a DATA frame transmitted by the UE in the uplink.

Further, after a newly active status UE contends successfully and transmits a data packet on the channel, if the first number N of data packets in the uplink queue of the UE have been uplink transmitted and at least one data packet in the uplink queue of the UE has not been uplink transmitted, then the UE converts to a traditionally active status, and the AP may save information of the UE into the list maintained for all traditionally active status devices by the AP.

Figure 8:
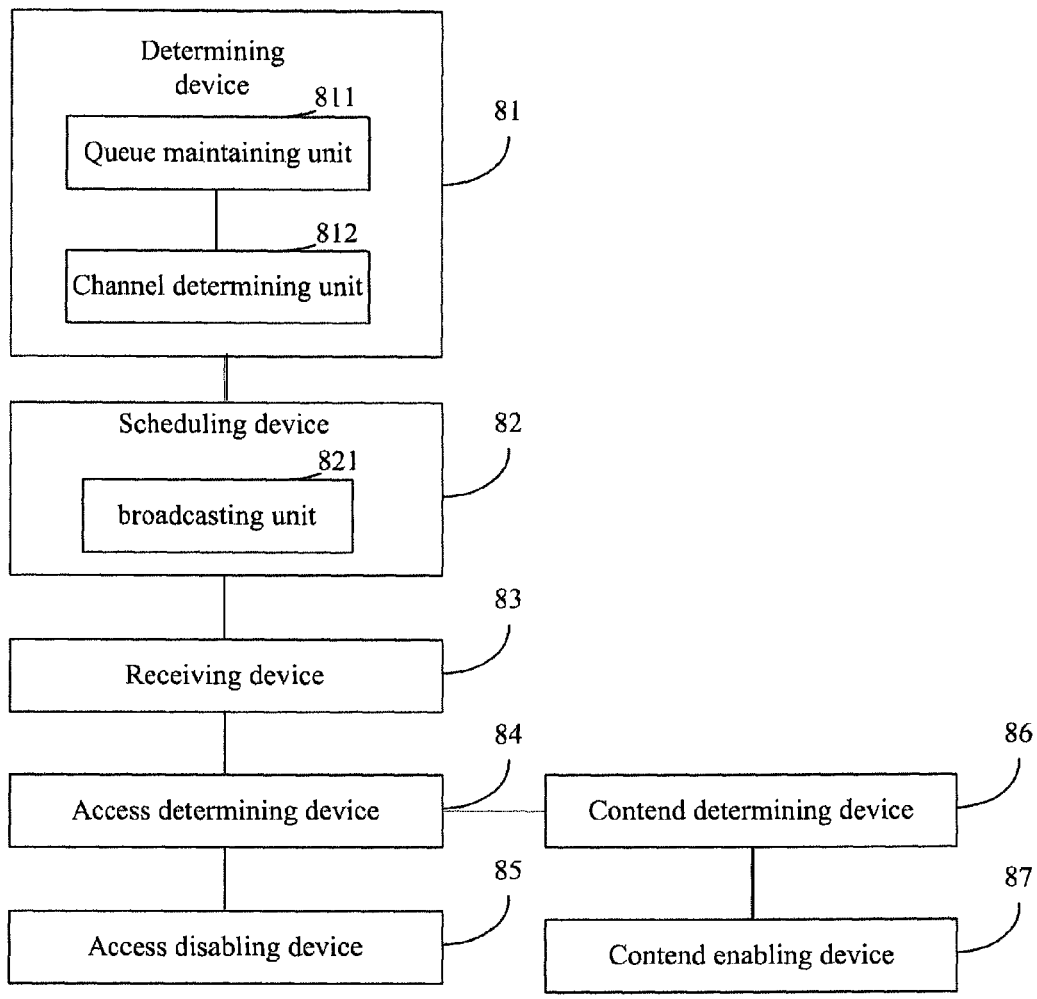
FIG. 8 is a schematic structural diagram of an access point in an embodiment of the invention.

An access point is provided according to an embodiment of the invention. As illustrated in FIG. 8, the access point comprises:

a determining device 81 configured for determining a next device for accessing a channel according to a predefined rule; and a scheduling device 82 configured, when the next device for accessing the channel determined by the determining device 81 is a traditionally active status device, for scheduling the traditional active status device to occupy the channel once the channel is free; and when the next device for accessing the channel determined by the determining device 81 is a newly active status device, for triggering the determining device 81 to determine a next traditionally active status device for accessing the channel according to the predefined rule and scheduling all newly active status devices and the next traditionally active status device for accessing the channel determined by the determining device 81 to contend for accessing the channel once the channel is free;

where, a traditionally active status device is an access point having a downlink data packet to be transmitted or a user equipment having an uplink packet burst to be transmitted in which at least a number N of data packets have been uplink transmitted and at least one data packet has not been uplink transmitted; a newly active status device is a user equipment having an uplink packet burst to be transmitted in which not all of a first number N of data packets have been uplink transmitted; and where, N is a positive integer.

Preferably, the scheduling device 82 is further configured, when a newly active status device contends successfully, for scheduling the next traditionally active status device for accessing the channel to occupy the channel once the newly active status device transmits a data packet on the channel and then frees the channel; and when the next traditionally active status device for accessing the channel contends successfully, for triggering the determining device 81 to determine a next device for accessing the channel according to the predefined rule.

Preferably, the scheduling device 82 comprises a broadcasting unit 821. The broadcasting unit 821 is configured for broadcasting a DATA frame or an ACK frame on the channel to all devices in a network, and where, the DATA frame or the ACK frame carries a NEXT ADDRESS field for identifying a next traditionally active status device for accessing the channel and a CONTEND PRIORITY field for identifying whether the device participates in contending for accessing the channel.

Preferably, the access point further includes:

a receiving device 83 configured for receiving the DATA frame or the ACK frame broadcasted by the broadcast unit 821;

an access determining device 84 configured for determining whether the access point is the next traditionally active status device for accessing the channel, according to the NEXT ADDRESS field carried in the DATA frame or the ACK frame received by the receiving device 83;

an access disabling device 85 configured, when the access determining device 84 determines the access point is not the next traditionally active status device for accessing the channel, for disabling the access point in participating in contending for accessing the channel once the channel is free;

a contend determining device 86 configured, when the access determining device 84 determines that the access point is the next traditionally active status device for accessing the channel, for determining whether the access point participates in contending for accessing the channel according to the CONTEND PRIORITY field carried in the DATA frame or the ACK frame received by the receiving device 83; and a contend enabling device 87 configured, when the contend determining device 86 determines that the access point participates in contending for accessing the channel, for enabling the access point to contend for accessing the channel once the channel is free; and when the contend determining device 86 determines that the access point does not participate in contending for accessing the channel, for enabling the access point to occupy the channel once the channel is free.

Preferably, the determining device 81 comprises:

a queue maintaining unit 811 configured for maintaining a queue for each traditionally active status device and maintaining a queue for all newly active status devices; and a channel determining unit 812 configured for determining the next device for accessing the channel according to a channel resource occupation condition of each queue maintained by the queue maintaining unit 811.

Where, the queue maintaining unit 811 is further configured for combining at least two queues for at least two traditionally active status devices belonging to the same user into one queue.

The channel determining unit 812 is configured for determining the next device for accessing the channel according to a channel resource occupation condition of each queue and a network service protocol of each user.

Figure 9:
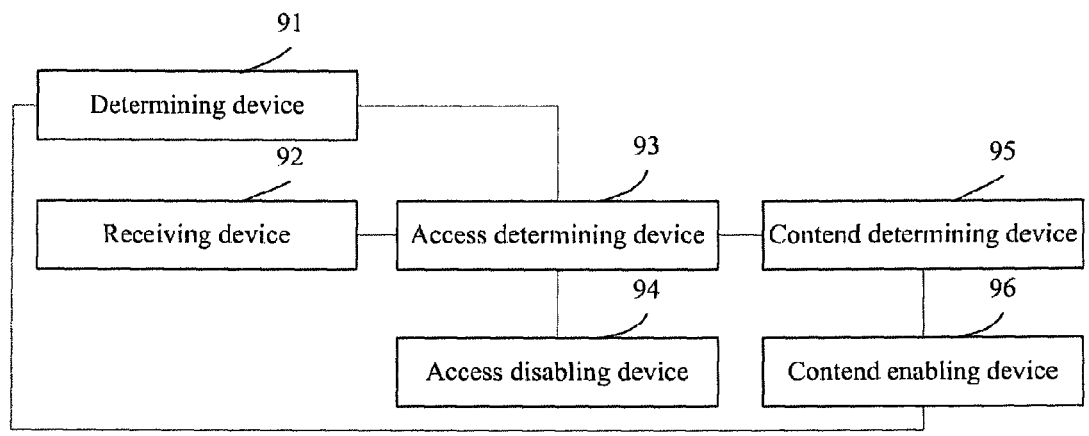
FIG. 9 is a schematic structural diagram of a user equipment in an embodiment of the invention.

A User Equipment (UE) is provided according to an embodiment of the invention. As illustrated in FIG. 9, the UE includes:

a determining device 91 configured for determining the user equipment as a traditionally active status device having an uplink packet burst to be transmitted in which at least a number N of data packets have been uplink transmitted and at least one data packet has not been uplink transmitted; or as a newly active status device having an uplink packet burst to be transmitted in which not all of a first number N of data packets have been uplink transmitted; where, N is a positive integer;

a receiving device 92 configured for receiving a DATA frame or an ACK frame broadcasted by an access point on a channel, where, the DATA frame or the ACK frame carries a NEXT ADDRESS field for identifying a next traditionally active status device for accessing the channel and a CONTEND PRIORITY field for identifying whether the next traditionally active status device participates in contending for accessing the channel;

an access determining device 93 configured, when the determining device 91 determines that the user equipment is a traditionally active status device, for determining whether the user equipment is the next traditionally active status device for accessing the channel, according to the NEXT ADDRESS field carried in the DATA frame or ACK frame received by the receiving device 92;

an access disabling device 94 configured, when the access determining device 93 determines that the user equipment is not the next traditionally active status device for accessing the channel, for disabling the user equipment in participating in contending for accessing the channel once the channel is free;

a contend determining device 95 configured, when the access determining device 93 determines that the user equipment is the next traditionally active status device for accessing the channel, for determining whether the user equipment participates in contending for accessing the channel according to the CONTEND PRIORITY field carried in the DATA frame or ACK frame received by the receiving device 92; and a contend enabling device 96 configured, when the contend determining device 95 determines that the user equipment participates in contending for accessing the channel, for enabling the user equipment to contend for accessing the channel once the channel is free; and when the contend determining device 95 determines that the user equipment does not participate in contending for accessing the channel, for enabling the user equipment to occupy the channel once the channel is free.

Preferably, the contend enabling device 96 is further configured, when the determining device 91 determines that the user equipment is a newly active status device, for enabling the user equipment to ignore the NEXT ADDRESS field and the CONTEND PRIORITY field carried in the DATA frame or ACK frame received by the receiving device 92 and to contend for accessing the channel once the channel is free.

Further, devices which do not support the solutions proposed in embodiments of the invention may adopt existing solutions in the art to access a channel under the contention-based channel access scheme, and ignore the NEXT ADDRESS and CONTEND PRIORITY fields carried in the broadcasted DATA or ACK frame.

With the solutions for controlling a channel access proposed in the embodiments of the invention, merely a first number N (e.g., N=1) of data packets in each packet burst of a UE have to be transmitted on a channel after the UE succeeds in contending for accessing the channel, the other data packets in the packet burst are transmitted on the channel according to the scheduling of an AP. In contending for accessing a channel, all current concurrent user equipments (i.e., all traditionally active status devices) are organized implicitly by an AP to form a single virtue device which contends for accessing the channel along with all newly added devices (i.e., newly active status devices).

With the solutions for controlling a channel access proposed in the embodiments of the invention, channel resource allocation for WLAN users can be implemented by operators with a relatively low complexity, a utilization ratio of a channel is improved greatly (regardless whether the number of concurrent users are large or small), and the implementation scheme is simple without amending an existing protocol frame and is compatible with a mainstream contention-based channel access scheme. That is, devices which do not support the solutions for controlling a channel access proposed in embodiments of the invention may acquire fair channel resources.

With the solutions for controlling a channel access proposed in the embodiments of the invention, the number of devices participating in contending for accessing a channel is reduced rapidly. Assuming there are a number X of traditionally active status devices and a number Y of newly active status devices in a network, then the number of devices participating in contending for accessing the channel may be reduced from X+Y to 1+Y, using the solutions proposed in the embodiments of invention. Further, generally, the number of newly active status devices is far below the number of traditionally active status devices, i.e., Y<<X, and in most cases Y is equal to 1, therefore the number of devices participating in contending is ensured substantially to be equal to 2 or below 2 (i.e., <=2), using the solutions in the embodiments of the invention, and thus a channel efficiency of 97% may be guaranteed.

With the solutions for controlling a channel access proposed in the embodiments of the invention, the problem in the mainstream contention-based channel access scheme that the efficiency drops rapidly along with an increasing number of active users may be solved.

With the solutions for controlling a channel access proposed in the embodiments of the invention, the AP may strongly control a shared channel to achieve a finer granularity control for the channel allocation with a very high probability. In combination with a queue scheduling scheme (e.g., WRR), operators may control channel resources in a user unit, which is similar to the channel resource control in a cellular network.

With the solutions for controlling a channel access proposed in the embodiments of the invention, no new signaling is required, and the problem in the AP-controlled channel access scheme, that a utilization ratio of a channel is low when the number of active users is small, may be addressed.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the apparatus (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for controlling a channel access, comprising:
   determining a next device for accessing a channel according to a predefined rule;
   when the determined next device for accessing the channel is a traditionally active status device, scheduling the traditional active status device to occupy the channel once the channel is free, wherein the scheduling of the traditional active status device comprises broadcasting a DATA frame or an ACK frame transmitted by an access point on the channel to all devices in a network, wherein, the DATA frame or the ACK frame carries a NEXT ADDRESS field for identifying a next traditionally active status device for accessing the channel and a CONTEND PRIORITY field for identifying whether the device participates in contending for accessing the channel;

when the determined next device for accessing the channel is a newly active status device, determining a next traditionally active status device for accessing the channel according to the predefined rule, and scheduling all newly active status devices and the next traditionally active status device to contend for accessing the channel once the channel is free, wherein the scheduling of all newly active status devices and the next traditionally active status device comprises broadcasting a DATA frame or an ACK frame transmitted by an access point on the channel to all devices in a network, wherein, the DATA frame or the ACK frame carries a NEXT ADDRESS field for identifying the next traditionally active status device for accessing the channel and a CONTEND PRIORITY field for identifying whether the device participates in contending for accessing the channel;

wherein, a traditionally active status device is an access point having a downlink data packet to be transmitted or a user equipment having an uplink packet burst to be transmitted in which at least a number N of data packets have been uplink transmitted and at least one data packet has not been uplink transmitted, wherein a newly active status device is a user equipment having an uplink packet burst to be transmitted in which not all of a first number N of data packets have been uplink transmitted, and wherein N is a positive integer.

2. The method of claim 1, further comprising:
when a newly active status device contends successfully, scheduling the next traditionally active status device for accessing the channel to occupy the channel once the newly active status device transmits a data packet on the channel and then frees the channel;
when the next traditionally active status device for accessing the channel contends successfully, performing the determining a next device for accessing a channel according to a predefined rule.

3. The method of claim 1, wherein the scheduling further comprises:
determining, by a traditionally active status device, whether itself is the next traditionally active status device for accessing the channel, according to the NEXT ADDRESS field carried in a received DATA frame or ACK frame;
when determining itself is not the next traditionally active status device for accessing the channel, not participating, by the traditionally active status device, in contending for accessing the channel once the channel is free.

4. The method of claim 3, wherein the scheduling further comprises:
when determining itself is the next traditionally active status device for accessing the channel, determining whether itself participates in contending for accessing the channel according to the CONTEND PRIORITY field carried in the received DATA frame or ACK frame; and
when determining itself participates in contending for accessing the channel, contending, by the traditionally active status device, for accessing the channel once the channel is free; and
when determining itself does not participate in contending for accessing the channel, occupying, by the traditionally active status device, the channel once the channel is free.

5. The method of claim 1, wherein, the scheduling further comprising:
ignoring the NEXT ADDRESS field and the CONTEND PRIORITY field carried in a received DATA frame or ACK frame and contending for accessing the channel once the channel is free, by a newly active status device.

6. The method of claim 1, wherein the determining a next device for accessing a channel according to a predefined rule comprises:
maintaining a queue for each traditionally active status device;
maintaining a queue for all newly active status devices; and
determining the next device for accessing the channel according to a channel resource occupation condition of each queue.

7. The method of claim 6, further comprising:
combining at least two queues for at least two traditionally active status devices belonging to the same user into one queue; and
wherein, the determining the next device for accessing the channel according to a channel resource occupation condition of each queue is:
determining the next device for accessing the channel according to a channel resource occupation condition of each queue and a network service protocol of each user.

8. An access point, comprising:
a determining device configured for determining a next device for accessing a channel according to a predefined rule; and
a scheduling device configured, when the next device for accessing the channel determined by the determining device is a traditionally active status device, for scheduling the traditional active status device to occupy the channel once the channel is free; and when the next device for accessing the channel determined by the determining device is a newly active status device, for triggering the determining device to determine a next traditionally active status device for accessing the channel according to the predefined rule and scheduling all newly active status devices and the next traditionally active status device for accessing the channel determined by the determining device to contend for accessing the channel once the channel is free;
wherein the scheduling device is further configured, when a newly active status device contends successfully, for:
scheduling the next traditionally active status device for accessing the channel to occupy the channel once the newly active status device transmits a data packet on the channel and then frees the channel; and when the next traditionally active status device for accessing the channel contends successfully, for triggering the determining device to determine a next device for accessing the channel according to the predefined rule,
wherein the scheduling device comprises a broadcasting unit, and the broadcasting unit is configured for broadcasting a DATA frame or an ACK frame on the channel to all devices in a network, and wherein, the DATA frame or the ACK frame carries a NEXT ADDRESS field for identifying a next traditionally active status device for accessing the channel and a CONTEND PRIORITY field for identifying whether the device participates in contending for accessing the channel, wherein the broadcasting unit is implemented by one or more processors, and wherein the one or more processors are coupled to a memory; and
wherein, a traditionally active status device is an access point having a downlink data packet to be transmitted or a user equipment having an uplink packet burst to be transmitted in which at least a number N of data packets have been uplink transmitted and at least one data packet has not been uplink transmitted; a newly active status device is a user equipment having an uplink packet burst to be transmitted in which not all of a first number N of data packets have been uplink transmitted; and wherein, N is a positive integer.

9. The access point of claim 8, further comprising:
a receiving device configured for receiving the DATA frame or the ACK frame broadcasted by the broadcasting unit;
an access determining device configured for determining whether the access point is the next traditionally active status device for accessing the channel, according to the NEXT ADDRESS field carried in the DATA frame or the ACK frame received by the receiving device; and
an access disabling device configured, when the access determining device determines the access point is not the next traditionally active status device for accessing the channel, for disabling the access point in participating in contending for accessing the channel once the channel is free.

10. The access point of claim 9, further comprising:
a contend determining device configured, when the access determining device determines that the access point is the next traditionally active status device for accessing the channel, for determining whether the access point participates in contending for accessing the channel according to the CONTEND PRIORITY field carried in the DATA frame or the ACK frame received by the receiving device; and
a contend enabling device configured, when the contend determining device determines that the access point participates in contending for accessing the channel, for enabling the access point to contend for accessing the channel once the channel is free; and when the contend determining device determines that the access point does not participate in contending for accessing the channel, for enabling the access point to occupy the channel once the channel is free.

11. The access point of claim 8, wherein, the determining device comprises:
a queue maintaining unit configured for maintaining a queue for each traditionally active status device and maintaining a queue for all newly active status devices; and
a channel determining unit configured for determining the next device for accessing the channel according to a channel resource occupation condition of each queue maintained by the queue maintaining unit;
wherein each of the queue maintaining unit and the channel determining unit is implemented by one or more processors, wherein the one or more processors are coupled to a memory.

12. The access point of claim 11, wherein, the queue maintaining unit is further configured for combining at least two queues for at least two traditionally active status devices belonging to the same user into one queue.

13. The access point of claim 12, wherein, the channel determining unit is configured for determining the next device for accessing the channel according to a channel resource occupation condition of each queue and a network service protocol of each user.

14. A user equipment, comprising:
a determining device configured for determining the user equipment as a traditionally active status device having an uplink packet burst to be transmitted in which at least a number N of data packets have been uplink transmitted and at least one data packet has not been uplink transmitted; or as a newly active status device having an uplink packet burst to be transmitted in which not all of a first number N of data packets have been uplink transmitted; wherein, N is a positive integer; and
a receiving device configured for receiving a DATA frame or an ACK frame transmitted by an access point on a channel, wherein, the DATA frame or the ACK frame carries a NEXT ADDRESS field for identifying a next traditionally active status device for accessing the channel and a CONTEND PRIORITY field for identifying whether the next traditionally active status device participates in contending for accessing the channel.

15. The user equipment of claim 14, further comprising:
an access determining device configured, when the determining device determines that the user equipment is a traditionally active status device, for determining whether the user equipment is the next traditionally active status device for accessing the channel, according to the NEXT ADDRESS field carried in the DATA frame or ACK frame received by the receiving device; and
an access disabling device configured, when the access determining device determines that the user equipment is not the next traditionally active status device for accessing the channel, for disabling the user equipment in participating in contending for accessing the channel once the channel is free.

16. The user equipment of claim 15, further comprising:
a contend determining device configured, when the access determining device determines that the user equipment is the next traditionally active status device for accessing the channel, for determining whether the user equipment participates in contending for accessing the channel according to the CONTEND PRIORITY field carried in the DATA frame or ACK frame received by the receiving device; and
a contend enabling device configured, when the contend determining device determines that the user equipment participates in contending for accessing the channel, for enabling the user equipment to contend for accessing the channel once the channel is free; and when the contend determining device determines that the user equipment does not participate in contending for accessing the channel, for enabling the user equipment to occupy the channel once the channel is free.

17. The user equipment of claim 14, wherein the contend enabling device is further configured, when the determining device determines that the user equipment is a newly active status device, for enabling the user equipment to ignore the NEXT ADDRESS field and the CONTEND PRIORITY field carried in the DATA frame or ACK frame received by the receiving device and to contend for accessing the channel once the channel is free.

* * * * *